United States Patent [19]
Itoh et al.

[11] Patent Number: 5,255,135
[45] Date of Patent: Oct. 19, 1993

[54] METHOD OF LOADING SLIDER AND MAGNETIC DISK APPARATUS

[75] Inventors: Seiji Itoh, Fukuoka; Masaharu Fukakusa, Kumamoto, both of Japan

[73] Assignee: Matsushita Electric Industrial Co., Ltd., Osaka, Japan

[21] Appl. No.: 713,210

[22] Filed: Jun. 11, 1991

[30] Foreign Application Priority Data

Jun. 12, 1990 [JP] Japan .................. 2-153664

[51] Int. Cl.$^5$ .......................... G11B 21/02
[52] U.S. Cl. ...................... 360/75; 360/109
[58] Field of Search ................ 360/75, 109

[56] References Cited

U.S. PATENT DOCUMENTS

| | | | |
|---|---|---|---|
| 4,146,911 | 3/1970 | Gyi et al. | 360/75 |
| 4,777,544 | 10/1988 | Brown et al. | 360/75 |
| 5,130,866 | 7/1992 | Klaassen et al. | 360/75 |
| 5,153,785 | 10/1992 | Muranushi et al. | 360/75 |
| 5,168,413 | 12/1992 | Coker et al. | 360/75 |

*Primary Examiner*—John S. Heyman
*Assistant Examiner*—Scott A. Onellette
*Attorney, Agent, or Firm*—Lowe, Price, LeBlanc & Becker

[57] ABSTRACT

A magnetic disk apparatus equipped with a negative pressure type slider having a magnetic head and being fixedly secured to a flexible member so as to be floatable with respect to the magnetic disk and bendable toward the magnetic disk by a pressing member. The apparatus moves the flexible member up to a position where the slider is above a predetermined track of the magnetic disk and successively presses the flexible member through the pressing member so that the magnetic head gradually moves toward the magnetic disk. At the same time, the apparatus successively reproduces an information signal from the predetermined track of the magnetic disk through the magnetic head so that the magnitude of the information signal reproduced is successively compared with a predetermined value corresponding to a predetermined distance between the magnetic head and the magnetic disk. The apparatus stops the pressing operation of the flexible member when the magnitude of the predetermined signal reproduced is greater than the predetermined value.

8 Claims, 5 Drawing Sheets

POSITION OF SLIDER RELATIVE TO THE DISK
AS SHOWN IN FIGS. 2A-2C

METHOD OF LOADING SLIDER AND MAGNETIC DISK APPARATUS

BACKGROUND OF THE INVENTION

The present invention relates to a method of loading a negative pressure type slider and further to a magnetic disk apparatus.

Generally, in magnetic disk apparatus there is a used a floating type slider having a magnetic head to perform the recording/reproduction of data. In order to position the magnetic head at a desirable track of a disk, a flexible member (which will be referred to as a flexer) is fixedly secured to an arm movable in directions traversing the tracks of the disk, and the floating type slider is attached to a tip portion of the flexer. Generally, a positive pressure type slider is used as the floating type slider. The operation of the slider thus arranged will be described hereinbelow.

Figure 1:
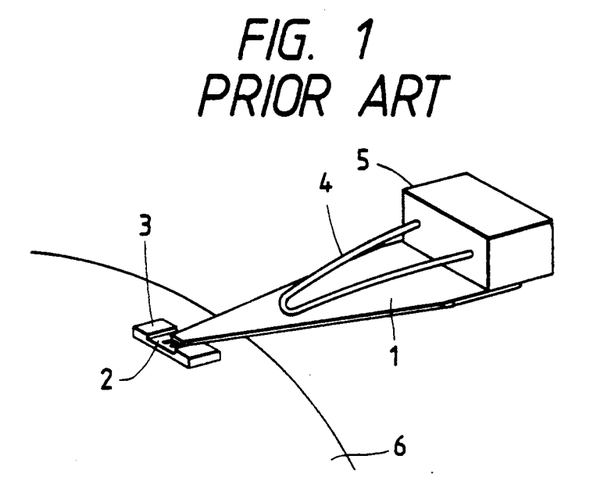
FIG. 1 is an illustration of an arrangement of a head-supporting section of a conventional magnetic disk apparatus.
Figure 2A:
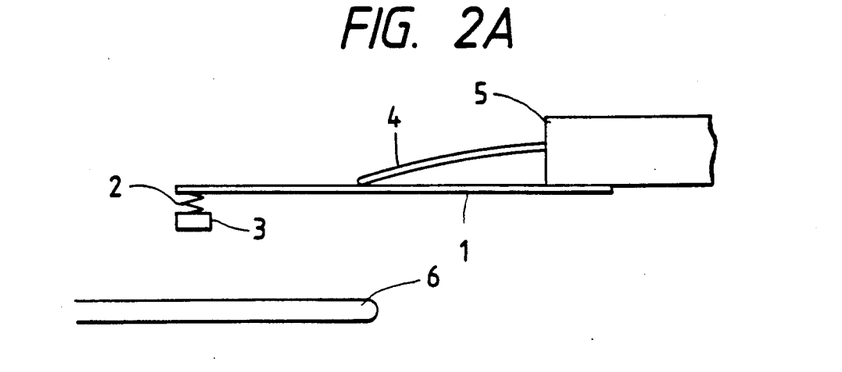
FIGS. 2A and 2C are illustrations for describing the operation of the head-supporting section of the magnetic disk apparatus illustrated in FIG. 1.
Figure 2B:
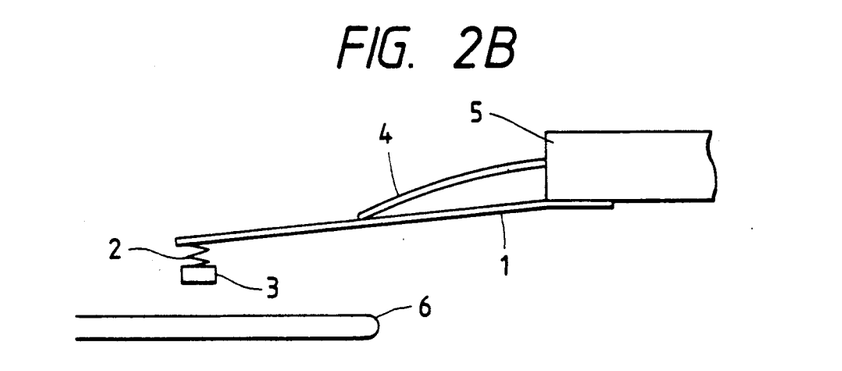
Figure 2C:
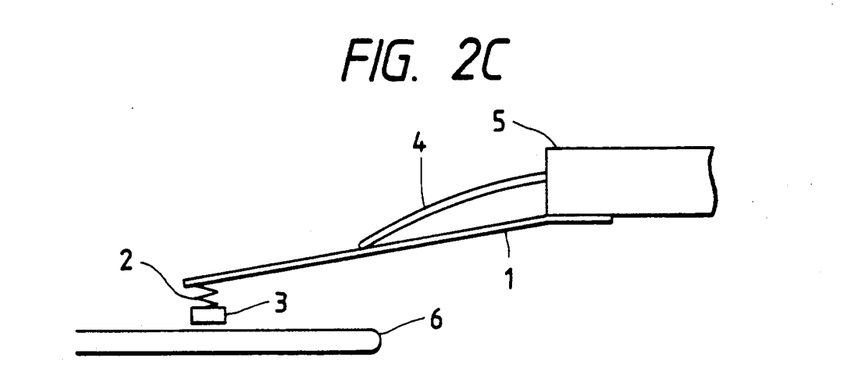
Figure 3:
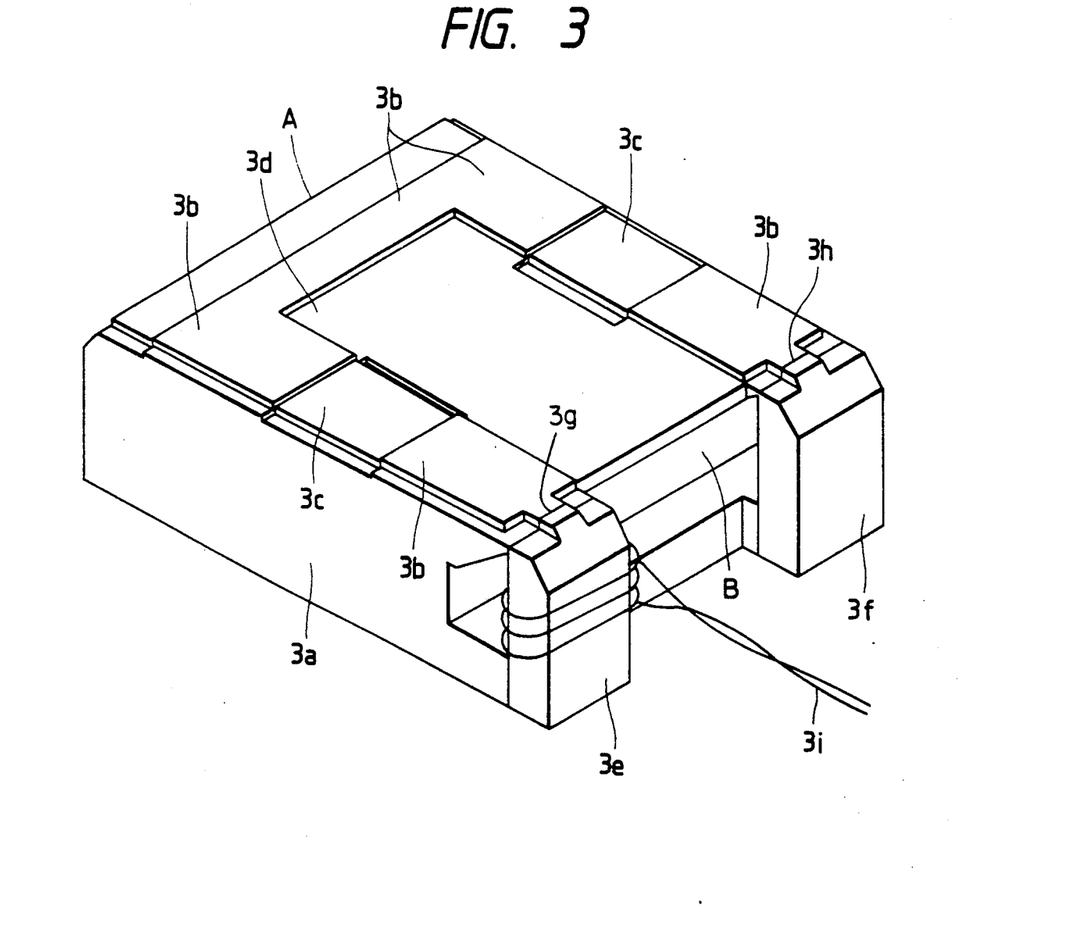
FIG. 3 is a perspective view showing an arrangement of a negative pressure type slider to be incorporated into the FIG. 1 magnetic disk apparatus.

At the time of the magnetic disk stopping, the slider is pressed by a constant load onto the magnetic disk surface and still comes into contact therewith for a while after the start of rotation of the magnetic disk. Thereafter, when the rotation speed of the magnetic disk exceeds a predetermined value, a positive pressure to be applied to the slider due to an air flow generated on the magnetic disk surface is balanced with the load acting upon the slider, and therefore the slider is floated and kept at the balancing position. Further, when the rotation speed of the magnetic disk decreases, the positive pressure decreases so that the slider again comes into contact with the magnetic disk surface and then stops. However, such an action causes the rubbing between the slider and the magnetic disk surface to generate the abrasion powder and damage them and further causes the adhesion between the slider and magnetic disk surface due to moisture on the magnetic disk surface. Thus, as a recent floating type slider, there has been proposed a negative pressure type slider which is arranged to be floated from the magnetic disk surface without contacting therewith. A magnetic disk apparatus using this negative pressure type slider will be described hereinbelow with reference to FIGS. 1 and 2A to 2C. In FIG. 1, illustrated at numeral 1 is a flexer which is constructed by leaf springs and illustrated at numeral 5 is an arm arranged to be movable in directions traversing data tracks recorded on a disk 6. The flexer 1 is bent at the vicinity of the arm 5 and fixedly secured to the arm 5 so as to generate a restoring force in a direction that the flexer 1 separates from the magnetic disk 6. Numeral 2 represents a gimbal constructed with a thin plate and fixedly secured to a top portion of the flexer 1. A slider 3 is attached to the gimbal 2. The gimbal 2 twists at the time of the rolling action and pitching action of the slider 3 and the slider 3 follows the magnetic disk 6 to float. FIG. 3 is an illustration for describing an arrangement of the slider 3. In FIG. 3, illustrated at $3a$ is a slider body constructed with a magnetic material such as a ferrite. In the slider body $3a$ there is provided a floatation rail $3b$ for generating a regulated pressure, and in the floatation rail $3b$ there is provided a step portion $3c$. Further, illustrated at $3d$ is a concaved portion surrounded by the floatation rail $3b$. In the concaved portion $3d$ there is generated a negative pressure. Still further, $3e$ and $3f$ are cores respectively coupled to the slider body $3a$ through non-magnetic materials $3g$ and $3h$ arranged to as act as magnetic gaps, and $3i$ designates lead wires wound around the core $3e$. Here, the magnetic recording/reproduction is effected only by the core $3e$. Air flows from an inflow side indicated by character A to an outflow side indicated by character B.

Referring back to FIG. 1, illustrated at numeral 4 is a flexer-pressing member which is constructed by bending a wire made of a shape-restorable alloy so as to have a V-shaped configuration, the flexer-pressing member 4 being fixedly secured to the arm 5. This flexer-pressing member 4 is arranged so as to store the shape to displace so that the flexer 1 becomes close to the magnetic disk 6 side when the shape restores. In response to being responsive to generation of heat due to flow of a current, the shape of the flexer-pressing member 4 is restored whereby the flexer 1 is displaced in the closing direction to the magnetic disk 6 so as to cause the slider 3 to float above the magnetic disk surface.

The operation of the magnetic disk apparatus thus arranged will be described hereinbelow with reference to FIGS. 2A to 2C. In FIG. 2A, the rotation of the magnetic disk 6 exceeds a predetermined speed and a current is then supplied to the flexer-pressing member 4, the shape of the flexer-pressing member 4 is restored so that the flexer 1 displaces to direct to the magnetic disk 6. In the state as illustrated in FIG. 2B, a positive pressure and negative pressure do not occur with respect to the slider 3 and the slider 3 is kept to be substantially parallel to the magnetic disk surface. In response to the displacement of the flexer 1, a positive pressure is generated with respect to the slider 3 so that the slider follows the magnetic disk 6 irrespective of occurrence of vibration of the magnetic disk 6 and vibration of the arm 5. Further, in response to the displacement of the flexer 1, the positive pressure gradually becomes greater and the slider 3 further becomes closer to the magnetic disk 6 with the state being kept as it is. When the flexer 1 takes the state as illustrated in FIG. 2C, i.e., when the flexer 1 approaches the magnetic disk 6 up to a predetermined distance, a negative pressure starts to gradually occur with respect to the slider 3 so that the slider 3 is drawn to the magnetic disk 6. Further, the slider 3 is floated so as to keep a constant distance with respect to the magnetic disk 6 with the positive and negative pressures generated with respect to the slider 3 and the restoring force of the flexer 1 being balanced with each other.

There is a problem with such a conventional arrangement, however, in that the magnetic disk apparatus have various relations in position between the flexer 1 and the arm 5 due to the errors on assembling the parts to vary the distance between the magnetic head and the magnetic disk 6. Accordingly, for instance, in the case that the distance between the magnetic head and the magnetic disk 6 is widened, difficulty can be encountered to cause the magnetic head to approach the magnetic disk 6 up to a desirable distance allowing sufficient generation of the negative pressure for the loading. On the other hand, in the case that the distance between the magnetic head and the magnetic disk 6 is narrowed, irrespective of the loading state being completed, the magnetic head can come into contact with the magnetic disk 6 to thereby cause crushing due to the excessive pressing force.

SUMMARY OF THE INVENTION

It is therefore an object of the present invention to provide a slider-loading method and magnetic disk apparatus which are capable of surely and safely allowing floatation of the slider irrespective of the variation or inaccuracy in dimension between the parts due to the assembling errors and the like.

According to the present invention, a magnetic disk apparatus is equipped with a negative pressure type slider having thereon a magnetic head and fixedly secured to a flexible member so as to be floatable by a pressure generated due to an air flow and bendable toward the magnetic disk by a pressing member. The apparatus moves the flexible member up to a position where the slider is above a predetermined track of the magnetic disk and successively presses the flexible member through the pressing member so that the magnetic head gradually moves toward the magnetic disk. At the same time, the apparatus successively reproduces an information signal from the predetermined track of the magnetic disk through the magnetic head so that the magnitude of the information signal reproduced is successively compared with a predetermined value which is determined in correspondance with the head reproduction output read out from the predetermined track of the magnetic disk when the slider is constantly separated by a predetermined distance from the magnetic head. The apparatus stops the pressing operation of the flexible member when the magnitude of the predetermined signal reproduced is greater than the predetermined value.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENT

Figure 4:
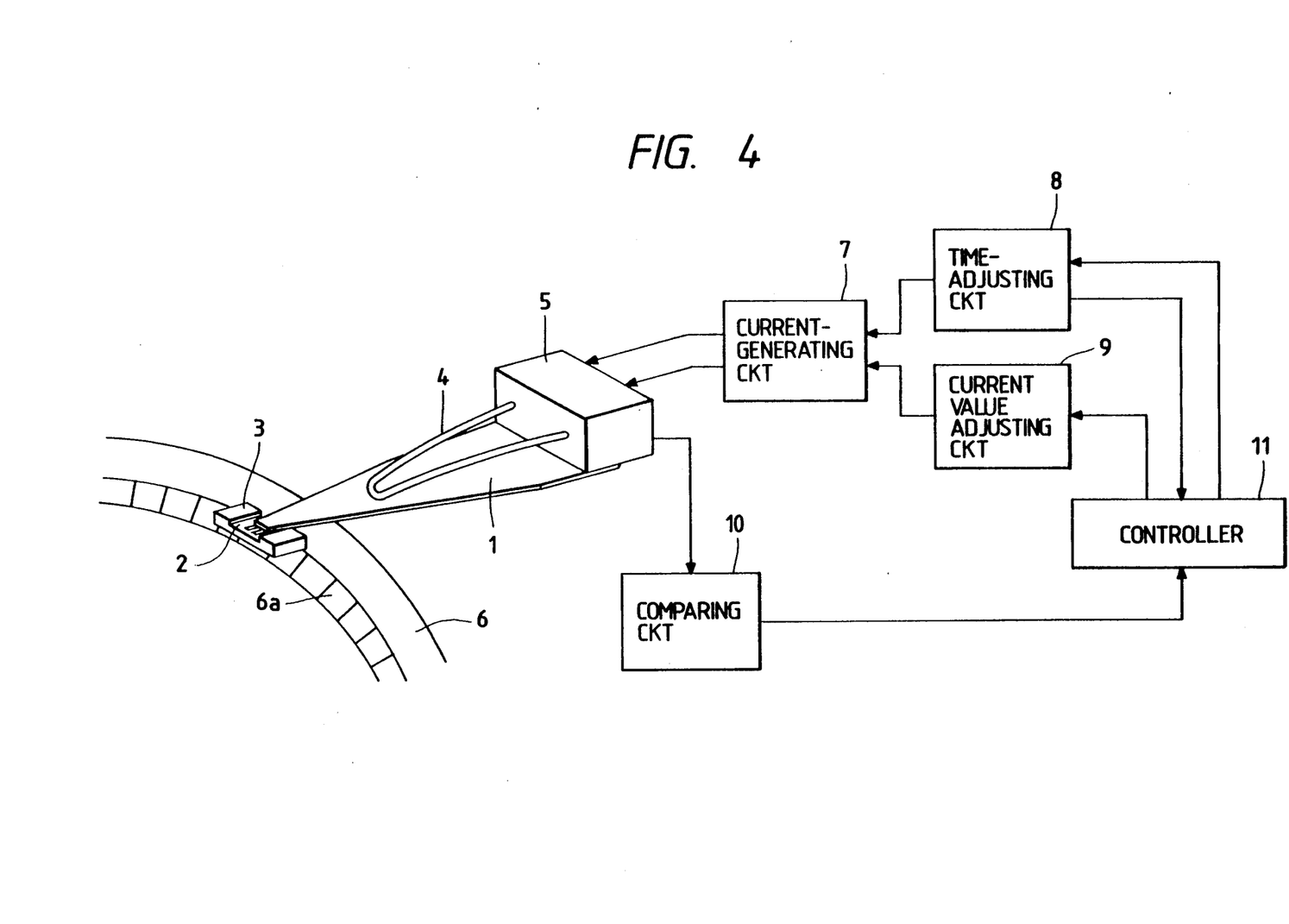
FIG. 4 is a block diagram showing an arrangement of a magnetic disk apparatus according to an embodiment of the present invention.
Figure 5:
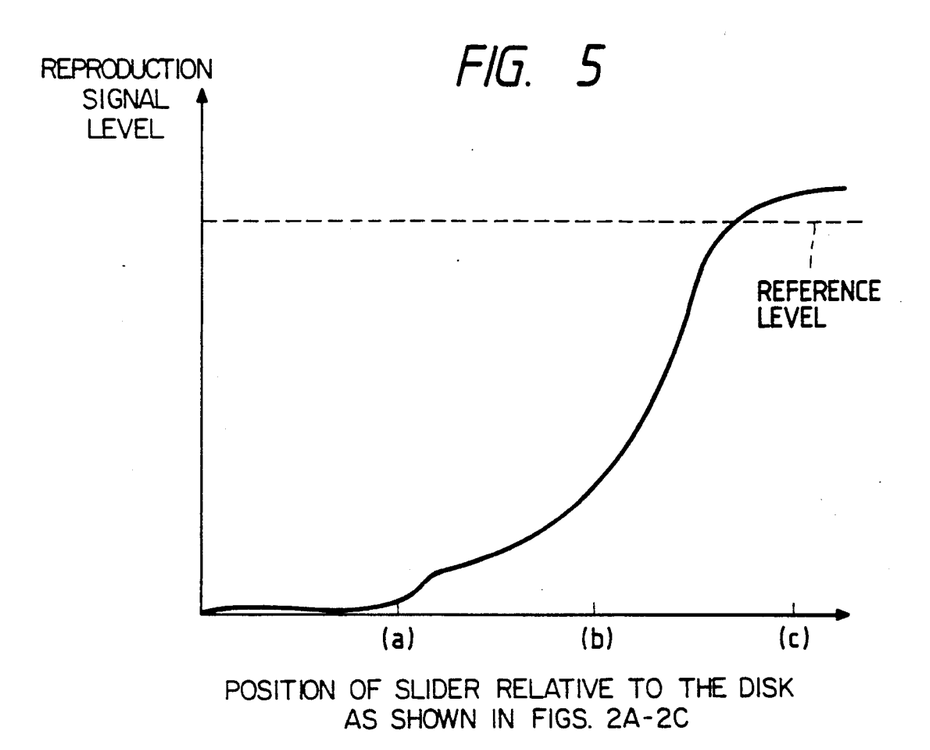
FIG. 5 is a graphic diagram showing the relation between the reproduction output and the distance of a magnetic disk from a slider.

Referring now to FIG. 4, there is illustrated a magnetic disk apparatus according to a first embodiment of the present invention. In FIG. 4, illustrated at numerals 1 to 5 are a flexer, a gimbal, a slider, a flexer-pressing member and an arm which have the same structures as those in the above-described conventional magnetic disk apparatus. Numeral 6 represents a magnetic disk having a similar structure to the conventional magnetic disk, while this magnetic disk 6 has a track on which the slider 3 is loaded and in the slider-loading track there is recorded a loading confirmation signal 6a. Numeral 7 designates a current generating circuit for supplying a current to the flexer-pressing member 4, 8 depicts a time adjusting circuit for controlling the time that the current due to the current generating circuit 7 flows through the flexer-pressing member 4, and 9 denotes a current value adjusting circuit for controlling the strength of the current to be supplied to the flexer-pressing member 4 by the current generating circuit 7. Further, numeral 10 is a reproduction output comparing circuit to be responsive to a reproduction output, which is the loading confirmation signal 6a read out by a magnetic head provided on the slider 3, so as to compare the magnitude of a reproduction output stored in advance in an internal memory with the magnitude of the reproduction output presently supplied from the magnetic head to output a signal corresponding to the comparison data. Data to be stored in the reproduction output comparing circuit 10 will be described hereinbelow with reference to FIG. 5. FIG. 5 is a graphic diagram showing a previously obtained relation between the distance of the slider 3 from the magnetic disk 6 and the reproduction output due to the magnetic head provided on the slider 3. In FIG. 5, the horizontal axis shows the moving distance of the slider 3 toward the magnetic disk 6 and the vertical axis shows the magnitude of the reproduction output which is the loading confirmation signal read out at that time. On the horizontal axis characters (a), (b) and (c) respectively correspond to the cases that the position relations between the magnetic disk 6 and the slider 3 become as illustrated in FIGS. 2A to 2C. As seen from FIG. 5, in accordance with the slider 3 moving toward the magnetic disk 6, the magnitude of the reproduction output becomes greater, while the magnitude of the reproduction output becomes constant when the slider 3 takes a floating state (c) separated by a constant distance therefrom. This fact can lead to the decision that the slide 3 takes a sufficiently closing state to the magnetic disk 6 for allowing adequate floatation above the magnetic disk 6 when the magnitude of the reproduction output reaches a level (floating level) indicated by (c) in FIG. 5. That is, if in different magnetic disk apparatus the magnetic disks and magnetic heads are of the same type and the relative speeds between the magnetic disks 6 and the magnetic heads are the same, the magnitudes of the reproduction outputs and the relations between the magnetic disks and the sliders 3 substantially become coincident with each other, respectively. Thus, the magnitude of the reproduction output to be obtained when the slider 3 floats above the magnetic disk 6 cam in advance be stored in the internal memory of the reproduction output comparing circuit 10.

Returning back to FIG. 4, illustrated at numeral 11 is a controller having therein an internal memory (not shown) for storing various data corresponding to the necessary current-supplying time to the flexer-pressing member 4 whereby the slider 3 is floatable above the magnetic disk 6 from the state that the slider 3 is not loaded on the magnetic disk 6 (the state of the slider 3 separated by a given distance from the magnetic disk 6 at the designed time) and/or corresponding to the current-supplying time and current strength, for example.

Secondly, a description will be made hereinbelow in terms of the operation of the magnetic disk apparatus arranged as described above. In response to the turning off of a power supply for the magnetic disk apparatus, the arm 5 moves so that the slider 3 is shifted up to a position above the loading region of the magnetic disk 6 where the loading confirmation signal 6a is recorded. The controller 11 then outputs the data, stored in advance in its internal memory, corresponding to the current-supplying time to the flexer-pressing member 4 and further outputs the data corresponding to the strength of the current supplied thereto, the current-supplying time data and the current strength data being respectively led to the time adjusting circuit 8 and the current value adjusting circuit 9. In response to the input of the signal from the controller 11, the time adjusting circuit 8 drives the current-generating circuit 7 so as to control the current-supplying time to the flexer-pressing member 4 in accordance with the signal therefrom. Further, in response to the input of the other signal from the controller 11, the current value adjusting circuit 9 drives the current-generating circuit 7 so as to control the strength of the current to be supplied thereto in accordance with the signal therefrom. Further, in response to flowing of the current from the current-generating circuit 7, the flexer-pressing member 4 is heated so as to cause its shape to restore whereby the flexer 1 is pressed and bent toward the magnetic disk 6. At this time, the reproduction output comparing circuit 10 always compares the magnitude of the reproduction output obtained by reading out the loading confirmation signal 6a through the magnetic head, provided in the slider 3, with the magnitude of the reproduction output stored in advance in its internal memory. When the magnitude of the reproduction output from the magnetic head is smaller than the magnitude of the reproduction output stored in the internal memory, the reproduction output comparing circuit 10 outputs a signal L1 to the controller 11. On the order hand, if greater, it outputs a signal L2 thereto. For instance, in the case that the distance between the magnetic disk 6 and the slider 3 before loading is shorter than a predetermined distance due to assembling errors, this arrangement can prevent the collision between the slider 3 and the magnetic disk 6 to be possible in the conventional magnetic disk apparatus. That is, when the slider 3 becomes close to the magnetic disk 6 up to a distance enough to allow the floatation, the magnitude of the reproduction output to be inputted from the magnetic head to the reproduction output comparing circuit 10 becomes greater than the magnitude of the reproduction output stored in the internal memory, and therefore the reproduction output comparing circuit 10 outputs the signal L2 to the controller 11. The controller 11 supplies the time adjusting circuit 8 and the current value adjusting circuit 9 with signals to stop the drive of the current-generating circuit 7 (stop the current to the flexer-pressing member 4) so as to prevent the flexer-pressing member 4 from further moving the flexer 1 toward the magnetic disk 6. This current-stopping operation is effected even if the current-supplying time to the flexer-pressing member 4 due to the previous command of the controller 11 is not yet lapsed. On the other hand, even in the case that the distance between the magnetic disk 6 and the slider 3 before loading becomes longer than the predetermined distance due to the assembling error, this arrangement can prevent the difficulty of the loading to be possible in the conventional magnetic disk apparatus. That is, when the current flows through the flexer-pressing member 4 for the time designated by the controller 11, the time adjusting circuit 8 supplies the controller 11 with a signal representative of the completion of the supply of the current thereto. Here, the controller 11 checks the input of the signal L2 from the reproduction output comparing circuit 10 immediately after the current-supply completion signal from the time adjusting circuit 8 is inputted thereto. If not yet inputted, the controller 11 again supplies control signals to both the time adjusting circuit 8 and current value adjusting circuit 9 so as to cause the current to flow through the flexer-pressing member 4 to allow further movement of the slider 3 toward the magnetic disk 6. At this time, the strength of the current to be supplied thereto is set to be stronger than that of the previously supplied current and the current-supplying time is not limited. When the signal L2 is inputted from the reproduction output comparing circuit 10 to the controller 11 during this operation, the controller 11 similarly supplies the time adjusting circuit 8 and the current value adjusting circuit 9 with signals in order to stop the current supply to the flexer-pressing member 4.

Figure 6:
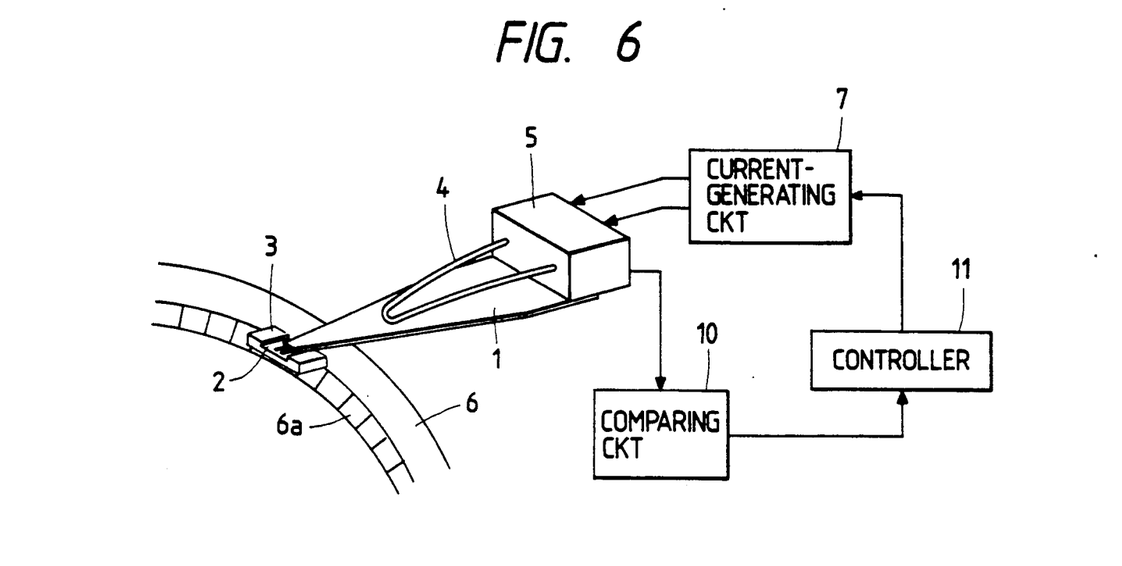
FIG. 6 is a block diagram showing a magnetic disk apparatus according to another embodiment of this invention.

FIG. 6 is a block diagram showing an arrangement of a magnetic disk apparatus according to another embodiment of the present invention. In FIG. 6, parts corresponding to those in FIG. 4 are marked with the same numerals and the description thereof will be omitted for brevity. The operation of the magnetic disk apparatus illustrated in FIG. 6 is as follows. In response to the turning-on of a power source for the magnetic disk apparatus, an arm 5 moves so that a slider 3 is shifted to be above a loading region of a magnetic disk 6 where a loading confirmation signal 6a is recorded. A controller 11 directly supplies a signal to a current-generating circuit 7 which in turn supplies a current to a flexer-pressing member 4 in accordance with the signal from the controller 11. Due to the supplied current, the flexer-pressing member 4 presses a flexer 1 toward the magnetic disk 6 so that the slider 3 approaches the magnetic disk 6. While effecting this operation, a reproduction output comparing circuit 10 compares the magnitude of the reproduction output from the magnetic head with the magnitude of the reproduction output stored in its internal memory. The reproduction output comparing circuit 10 outputs a signal L1 if the magnitude of the stored reproduction output is greater in magnitude than the magnitude of the reproduction output from the magnetic head and outputs a signal L2 if smaller than the magnitude of the reproduction output therefrom. Since at the initial time the interval between the slider 3 and the magnetic disk 6 is widened such that the magnitude of the reproduction output from the magnetic head is smaller than the magnitude of the reproduction output stored in the internal memory, the reproduction output comparing circuit 10 outputs the signal L1 to the controller 11. Thereafter, when the slider 3 sufficiently approaches the magnetic disk 6 so as to allow the floatation thereabove, the magnitude of the reproduction output from the magnetic head becomes greater than the magnitude of the reproduction output stored in the internal memory. As a result, the reproduction output comparing circuit 10 outputs the signal L2 to the controller 11. In response to the input of the signal L2, the controller 11 outputs a signal to the current-generating circuit 7 which in turn stops the supply of the current to the flexer-pressing member 4.

Figure 7:
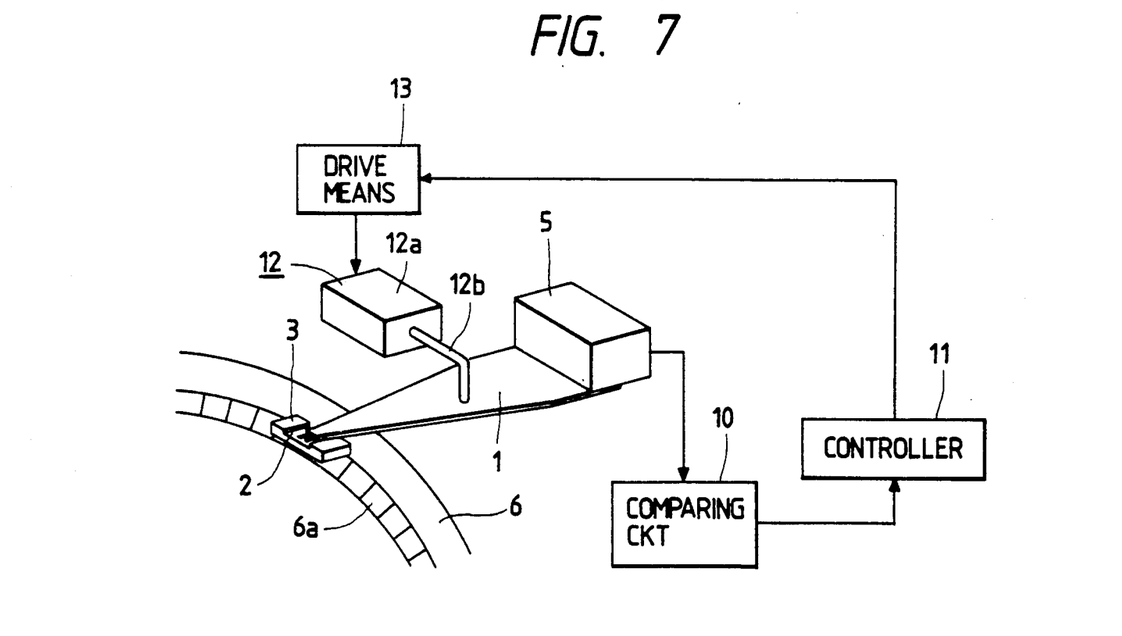
FIG. 7 is a block diagram showing a magnetic disk apparatus according to a further embodiment of this invention.

FIG. 7 is a block diagram showing an arrangement of a magnetic disk apparatus according to a further embodiment of this invention. In FIG. 7, parts corresponding to those in FIG. 4 or 6 are marked with the same numerals and the description thereof will be omitted for brevity. One difference of this embodiment from the above-described embodiments is that a flexer-pressing member 12 is composed of a supporting section 12a and a pin 12b attached to the supporting section 12a to press a flexer 1.

A description will be made hereinbelow in terms of the operation of the magnetic disk apparatus thus arranged. In FIG. 7, in response to the turning-on of a power source, an arm 5 moves to cause a slider 3 to be shifted up to a position above a loading region recording a loading confirmation signal 6a. Thereafter, a controller 11 supplies a signal a drive means 13. In response to the input of the signal therefrom, the drive means 13 moves the flexer-pressing member 12 toward a magnetic disk 6 whereby the flexer 1 is bent to the magnetic disk 6 side in order to move the slider 3 to be close to the magnetic disk 6. While effecting this operation, a reproduction output comparing circuit 10 similarly compares the magnitude of the reproduction output from the magnetic head, provided on said slider 3, with the magnitude of the reproduction output stored in its internal memory. If the magnitude of the reproduction output stored is greater than the magnitude of the reproduction output from the magnetic head, the comparing circuit 10 outputs a signal L1 to the controller 11, and if smaller than the magnitude of the reproduction output from the magnetic head, it outputs a signal L2 thereto. Since the distance between the slider 3 and the magnetic disk 6 is widened at the initial time so that the magnitude of the reproduction output from the magnetic head is smaller than the magnitude of the reproduction output stored in the internal memory, the reproduction output comparing circuit 10 outputs the signal L2 to the controller 11. On the other hand, when the slider 3 sufficiently approaches the magnetic disk 6 so as to allow the floatation to cause the magnitude of the reproduction output from the magnetic head becomes equal to or greater than the magnitude of the reproduction output stored, the reproduction output comparing circuit 10 outputs the signal L2 thereto. In response to the input of the signal L2, the controller supplies a signal to the drive means 13 which in turn control the flexer-pressing member 12 so that the flexer 1 does not additionally approach the magnetic disk 6.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the above-described embodiments the loading confirmation signal is recorded in advance at one track of a magnetic disk so as to effect the slider floatation control, in the servo surface servo system or the data surface servo system it is appropriate to use a servo signal in place of the loading confirmation signal. Further, although the flexer-pressing member is attached to the arm, it is also appropriate that the flexer-pressing member is attached to a different member.

What is claimed is:

1. A method of loading a negative pressure type slider of a magnetic disk apparatus for recording and reproducing information on and from a magnetic disk, said slider having a magnetic head and being fixedly secured to a flexible member so as to be floatable with respect to said magnetic disk and bendable toward said magnetic disk by pressing means, said method comprising the steps of:
    (a) pressing said flexible member by said pressing means so that said slider moves toward said magnetic disk;
    (b) reproducing a predetermined signal from said magnetic disk by means of said magnetic head so that the magnitude of said predetermined signal reproduced is compared with a predetermined level; and
    (c) stopping the pressing operation of said flexible member when the magnitude of said predetermined signal reproduced is greater than said predetermined level.

2. A method as claimed in claim 1, wherein said predetermined signal is in advance recorded at a predetermined track of said magnetic disk and said magnetic head is initially moved up to a position above said predetermined track of said magnetic disk.

3. A method of loading a negative pressure type slider of a magnetic disk apparatus for recording and reproducing information on and from a magnetic disk, said slider having a magnetic head and being fixedly secured to a flexible member so as to be floatable by a pressure to be generated with respect to said magnetic disk and bendable toward said magnetic disk by pressing means, said method comprising the steps of:
    (a) moving said flexible member up to a position where said magnetic head is above a predetermined track of said magnetic disk;
    (b) successively pressing said flexible member by said pressing means so that said magnetic head gradually moves toward said magnetic disk;
    (c) successively reproducing an information signal from said predetermined track of said magnetic disk by means of said magnetic head so that the magnitude of said information signal reproduced is successively compared with a predetermined value corresponding to a predetermined distance between said magnetic head and said magnetic disk; and
    (d) stopping the pressing operation of said flexible member when the magnitude of said predetermined signal reproduced is greater than said predetermined value.

4. A magnetic disk apparatus comprising:
    (a) a magnetic head for recording and reproducing information on and from a magnetic disk, said magnetic head being provided on a negative pressure type slider floatable by a pressure generated due to air flow;
    (b) an arm movable in directions parallel to a surface of said magnetic disk;
    (c) a flexible member one end portion of which is fixedly secured to said arm, said flexible member flexibly bendable with respect to said arm, said slider being attached to the other end portion of said flexible member;
    (d) pressing means for pressing said flexible member so that said magnetic head approaches said magnetic disk;
    (e) drive means for driving said pressing means in accordance with a control signal;
    (f) comparing means for comparing a magnitude of a reproduction output read out from a predetermined track of said magnetic disk by means of said magnetic head with a predetermined value; and
    (g) control means coupled to said comparing means so as to output said control signal to said drive means to stop the pressing operation of said flexible member when the magnitude of the read reproduction output becomes equal to or greater than said predetermined value.

5. A magnetic disk apparatus as claimed in claim 4, wherein said predetermined value is determined so as to be equal to a reproduction output to be read out when said slider head is constantly separated by a predetermined distance from said magnetic disk.

6. The magnetic disk apparatus of claim 4, wherein said drive means comprises:
   means for supplying a current to said pressing means;
   a time adjusting circuit coupled to said current supplying means and said control means to control a time period for applying the current to said pressing means; and
   a current adjusting circuit coupled to said current supplying means and said control means to control a value of said current to said pressing means.

7. The magnetic disk apparatus of claim 4, wherein said drive means comprises a current generating circuit, said current generating circuit supplying current to said pressing means when the read reproduction output becomes smaller than said predetermined value.

8. The magnetic disk apparatus of claim 4, wherein said pressing means comprises:
   a supporting section coupled to said drive means;
   a pin coupled to said supporting section and pressing said flexible member in response to a signal from said drive means.

* * * * *